(12) United States Patent
Jeannot et al.

(10) Patent No.: US 7,864,339 B2
(45) Date of Patent: Jan. 4, 2011

(54) METHOD FOR THE CONTACTLESS MEASUREMENT OF THREE-DIMENSIONAL OBJECTS WITH TWO LAYERS BY SINGLE-VIEW BACKLIT SHADOWGRAPHY

(75) Inventors: Laurent Jeannot, Is sur Tille (FR); Alexandre Choux, Dijon (FR); Eric Busvelle, Auxerre (FR); Jean-Paul Gauthier, Toulon (FR)

(73) Assignee: Commissariat a l'Energie Atomique, Paris (FR)

( * ) Notice: Subject to any disclaimer, the term of this patent is extended or adjusted under 35 U.S.C. 154(b) by 129 days.

(21) Appl. No.: 12/438,134

(22) PCT Filed: Aug. 21, 2007

(86) PCT No.: PCT/EP2007/058690

§ 371 (c)(1),
(2), (4) Date: Feb. 19, 2009

(87) PCT Pub. No.: WO2008/023024

PCT Pub. Date: Feb. 28, 2008

(65) Prior Publication Data

US 2010/0171961 A1 Jul. 8, 2010

(30) Foreign Application Priority Data

Aug. 23, 2006 (FR) ................... 06 53435

(51) Int. Cl.
*G01B 11/02* (2006.01)
*G01B 11/28* (2006.01)
*G01N 21/41* (2006.01)
*G01N 21/43* (2006.01)

(52) U.S. Cl. ............. 356/511; 356/517; 356/503; 356/630

(58) Field of Classification Search .......... 356/503, 356/504, 496, 511, 517, 518, 601, 630, 632
See application file for complete search history.

(56) References Cited

U.S. PATENT DOCUMENTS 3,617,130 A * 11/1971 Kelley et al. ............. 356/518

(Continued)

FOREIGN PATENT DOCUMENTS

EP 0294889 A1 12/1988

(Continued)

OTHER PUBLICATIONS

International Search Report, PCT/FR2005/050716, mailed Feb. 14, 2006 (6 pages).

(Continued)

*Primary Examiner*—Patrick J Connolly
(74) *Attorney, Agent, or Firm*—Nixon Peabody LLP

(57) ABSTRACT

To measure a hollow three-dimensional object without contact, this object being translucent or transparent vis-á-vis a visible light, an image of the object is acquired by single-view backlit shadowgraphy, along a viewing axis, by observing this object with visible light, this image comprising at least one luminous line, an equation is established that connects at least one optogeometric parameter of the object to at least one geometric parameter of the luminous line, this geometric parameter is determined, and the optogeometric parameter is determined by means of the equation and the geometric parameter thus determined.

7 Claims, 3 Drawing Sheets

U.S. PATENT DOCUMENTS

| | | | |
|---|---|---|---|
| 4,168,907 A | | 9/1979 | Presby |
| 4,227,806 A | | 10/1980 | Watkins |
| 5,118,954 A | | 6/1992 | Grosso |
| 6,651,502 B1 * | | 11/2003 | Davis ........................ 73/606 |
| 7,307,740 B2 * | | 12/2007 | Lamy et al. ................ 356/632 |
| 7,505,561 B1 * | | 3/2009 | Fuller ......................... 378/86 |
| 2006/0215180 A1 * | | 9/2006 | Lamy et al. ................ 356/625 |
| 2008/0074680 A1 * | | 3/2008 | Laurent et al. ............. 356/601 |
| 2010/0171961 A1 * | | 7/2010 | Jeannot et al. ............. 356/503 |

FOREIGN PATENT DOCUMENTS

| | | |
|---|---|---|
| FR | 2651312 A1 | 3/1991 |
| FR | 2852389 A1 | 9/2004 |
| FR | 2006/030149 A1 | 3/2006 |
| FR | 2875295 A1 | 3/2006 |
| WO | 2004/083772 A1 | 9/2004 |
| WO | 2007/110395 A | 10/2007 |

OTHER PUBLICATIONS

U.S. Appl. No. 10/547,783, filed Sep. 6, 2005, entitled, "Method For Measuring Three-Dimensional Objects By Single View Backlit Shadowgraphy", inventors Francis Lamy et al., pp. 1-23.

Haralick, Robert M., "Digital Step Edges From Zero Crossing of Second Directional Derivatives", IEEE Transactions on Pattern Analysis and Machine Intelligence, vol. PAMI-6, No. 1, pp. 58-68 (Jan. 1984).

* cited by examiner

METHOD FOR THE CONTACTLESS MEASUREMENT OF THREE-DIMENSIONAL OBJECTS WITH TWO LAYERS BY SINGLE-VIEW BACKLIT SHADOWGRAPHY

CROSS REFERENCE TO RELATED APPLICATIONS OR PRIORITY CLAIM

This application is a national phase of International Application No. PCT/EP2007/058690, entitled "METHOD OF CONTACT-LESS MEASUREMENT OF TWO-LAYERED THREE-DIMENSIONAL OBJECTS BY SINGLE-VIEW OPTICAL OMBROSCOPY", which was filed on Aug. 21, 2007, and which claims priority of French Patent Application No. 06 53435, filed Aug. 23, 2006.

DESCRIPTION

1. Technical Field

The present invention concerns a method for the contactless measurement, or characterisation, of three-dimensional objects with two layers by single-view backlit shadowgraphy.

This method applies in particular to:

the contactless measurement of the deformation or roughness of the internal surface of a transparent hollow object with two layers, the measurement of the refractive indices of an isotropic transparent hollow object with two layers, the measurement of the thickness of the internal layer of a transparent hollow object with two layers, putting the internal layer of such an object in conformity, by controlling recovery, and calculation of the roughness of such an object, on the basis of a three-dimensional reconstruction by spherical harmonic analysis methods.

The contactless dimensional measurement of a hollow three-dimensional object with two layers, which is transparent or at least translucent vis-à-vis visible light, presents many difficulties.

To overcome these difficulties, it is known to use a technique of measurement by backlit shadowgraphy. This technique applies to the characterisation of objects that can be observed at a single viewing angle, in particular objects to which it is difficult to gain access.

In the present invention, the objects characterised are essentially hollow spheres.

This invention makes it possible to approximate spatially an area of the internal surface of an observed object, from a shadowgraphic exposure of this object, and to determine the state of the internal surface of a translucent hollow object with two layers, by means of shadowgraphic and interferometric observations.

2. Prior Art

Two techniques are known for measuring the thickness and diameter of hollow spheres, namely interferometry and X-radiography. The latter cannot be used if the object is placed in a complex infrastructure and cannot be manipulated from the outside.

Certainly there exist methods of three-dimensional reconstruction of objects using a single image, but their implementation assumes that these objects have a large number of symmetries. In addition, the reconstruction is global.

Interferometry for its part is a precise method that can be used in a complex infrastructure, but its implementation is fairly tricky.

Two methods are also known for measuring three-dimensional objects by backlit shadowgraphy, through the following documents, to which reference will be made:

[1] International Application WO 2004/083772 A published on 30 Sep. 2004, "Method of measuring three-dimensional objects by single-view optical shadowgraphy"

[2] International Application WO 2006/030149 A published on 23 Mar. 2006, "Method of measuring dimensional objects by single-view optical shadowgraphy, using light propagation optical laws".

The technique that is disclosed by document [1] requires the systematic creation of a data table from simulations made by means of optical software, this table covering the whole range of dimension of the objects to be observed. The data in the table make it possible to go back, by interpolation, to a dimensional measurement of the object. The greater the range of dimensions introduced into the data table, the longer it takes to create this table if it is wished to maintain a certain degree of precision.

The technique disclosed by document [2] is based on the Snell-Descartes optogeometric laws and constitutes only a summary approximation of the state of the internal surface of the hollow object that it is wished to characterise. In this technique, the curve observed is directly used as being the internal wall of the internal layer of this object. In addition, the observation zone is limited to the equatorial plane of the object, which is generally spherical. No spatial reconstruction of the internal surface of a hollow object has been made using this technique. In addition, no spatial reconstruction method is mentioned in document [2].

DISCLOSURE OF THE INVENTION

The aim of the present invention is to remedy the aforementioned drawbacks.

It concerns mainly the three-dimensional reconstruction of the internal wall of a two-layer object over an area close to the equator of this object, from a shadowgraphic image of the object.

In addition to this contactless optical method, another means of characterisation on several points is used. Thus a global three-dimensional reconstruction of the internal wall of a two-layer object, which is translucent or transparent to light rays, is carried out.

This three-dimension reconstruction is global since the entire internal wall is reconstructed. To do this, special functions are used that parameterise a deformed sphere.

The shadowgraphic method makes it possible to observe an area that is close to the equator of the object. The image observed using this method must be analysed. The information is situated in the main light ring that the image comprises and is the intersection of the plane of observation with a caustic.

A linear relationship exists between the deformation of the main light ring and the disturbances present on the internal wall of the two-layer object. This relationship establishes a correspondence between bidimensional information obtained from the image and three-dimensional information.

Spatial reconstruction from bidimensional information is the most important element of the present invention. Up to the present time, nobody had sought to establish a link between a deformed caustic and a disturbance of the internal wall of a hollow object.

In the invention, the interferometric method is used to directly measure the thickness of the internal layer of the object and therefore the deformation of this internal layer. However, this method makes it possible to make observations only over a limited area of the two-layer object since the latter is generally placed in a complex environment that greatly limits movements.

This is why the spatial reconstruction of the internal surface of the two-layer object is based on the merging of the shadowgraphic and interferometric data. The data merging is therefore another important element of the present invention, after the spatial reconstruction from an image obtained by backlit shadowgraphy.

In precise terms, the present invention concerns a method for the contactless measurement of a hollow three-dimensional object, thus having an internal wall, this object comprising an external layer and an internal layer, this object being translucent or transparent vis-á-vis a visible light, this method being characterised in that:

an image of the object is acquired by single-view backlit shadowgraphy, along a first viewing axis, by observing this object with visible light, this image comprising at least one luminous line (ring or band), an equation is established that connects at least one optogeometric parameter of the object to at least one geometric parameter of the luminous line, this geometric parameter is determined, and the optogeometric parameter is determined by means of the equation and geometric parameter thus determined.

According to a preferred embodiment of the method that is the object of the invention:

a three-dimensional reconstruction is made of the internal wall of the three-dimensional object over an area that is close to the equator of this object, from the image of the object and the equation, this reconstruction supplying a first set of data, the thickness of the internal layer of the object is determined, a second set of data relating to the deformation of this internal layer is determined from the thickness thus determined, and a reconstruction of the entire internal wall of the object is carried out by means of the first and second sets of data.

Preferably a linear relationship is established between a deformation of the luminous line and disturbances that are present on the internal wall of the object, in order to determine the second set of data.

According to a first particular embodiment of the method that is the object of the invention, the thickness of the internal layer of the three-dimensional object is determined by an interferometric technique.

According to a second particular embodiment, the thickness of the internal layer of the three-dimensional object is determined by a shadowgraphic measurement made along a second viewing axis that is not parallel to the first viewing axis.

According to a third particular embodiment, the thickness of the internal object of the three-dimensional objection is determined by a shadowgraphic measurement made along the first viewing axis after having made a rotation of the object.

Preferably the reconstruction of the entire internal wall of the three-dimensional object is carried out by combining the first and second sets of data by means of the method of least squares.

According to a particular embodiment of the method that is the object of the invention, two optogeometric parameters are determined, consisting respectively of the refractive index of the internal layer and the refractive index of the external layer of the three-dimensional object, from two geometric parameters, respectively consisting of the thickness of the internal layer and the thickness of the external layer.

BRIEF DESCRIPTION OF THE DRAWINGS

The present invention will be better understood from a reading of the description of example embodiments given below, purely by way of indication and in no way limitatively, referring to the accompanying drawings, in which.

DETAILED DISCLOSURE OF PARTICULAR EMBODIMENTS

Figure 1:
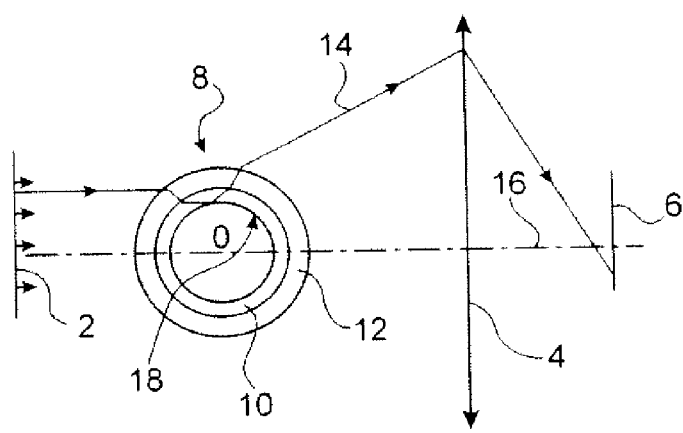
FIG. 1 is a schematic view of a backlit shadowgraphic device that can be used in the present invention.

The present invention is characterised by (a) a three-dimensional reconstruction over a small vicinity close to the equator of the transparent object that it is wished to characterise, and (b) a merging of data.

These data are obtained both by a single-view backlit shadowgraphic device in visible light and an interferometric device.

The observation of the transparent object by visible light shadowgraphy is associated with an optical light propagation model that takes account of the interactions of this propagation at the various interfaces of the object. This measurement principle makes it possible to connect the direct measurement on the image, which is obtained by shadowgraphy, to the deformations of the internal surface of the object studied and the dimensional quantities of this object.

Backlit shadowgraphy is a simple measurement method for studying flat objects but, for objects in three dimensions, the image obtained by this method does not provide enough information. This is because the image observed of a cross section of an object is not solely the image of the cross section through the objective lens of the shadowgraphic device: it is the image of the cross section through this lens and the object itself.

Observation of the object by interferometry makes it possible to connect the direct measurement with the dimensional characteristics of the object.

The combination of the shadowgraphic measurements with the interferometric measurements by means of an algorithm based on the method of least squares gives a spatial estimation of the internal surface of the object observed.

Complementarity between backlit shadowgraphy and interferometry is more simple to implement in a complex structure, where there is only a single viewing axis, unlike tomography, which is normally used in this case (three dimensions) but makes it necessary to observe the object at several angles of incidence, which is not possible in the present case.

A study has been carried out on two-layer hollow spheres (spherical objects), all the characteristics of which are known, in particular the optical index and the thickness of each layer, except possibly the optical index of the internal layer.

Shadowgraphy reveals luminous rings. Each of these is characterised by a concentration of light rays, referred to as a "caustic". An analysis of this caustic establishes a link between the corresponding luminous ring observed and the internal surface of the object. This makes it possible to use the direct measurement on the image.

A measurement method according to the invention is mainly based on this analysis and on the combination of measurements by the method of least squares.

An example of implementation of the method that is the object of the invention is given below, for a hollow spherical object, more simply referred to as a "hollow sphere", which comprises two layers and is transparent to visible light.

In this example, the first layer is a hollow polymer sphere, the outside diameter and thickness of which are equal respectively to 2430 µm and 175 µm and the optical index of which is equal to 1.54 at the main wavelength of the visible light source; and the second layer has a thickness of 100 µm and an optical index of 1.16 at this wavelength.

FIG. 1 is a schematic view of a backlit shadowgraphic device that can be used in this example and comprises a collimated visible light source 2, an objective 4 and a screen 6. The object studied 8 is placed between the source 2 and the objective 4; its external layer has the reference 10 while its internal layer has the reference 12. A light ray 14 can also be seen which goes from the source to the screen, passing through the object and then the lens.

Let us consider first of all the characterisation of the main luminous ring, that is to say the luminous ring that is most visible on a real image, obtained by single-view backlit shadowgraphy.

From such an image, on which the main luminous ring is therefore visible, it is possible to form a radial profile of this image, on which this luminous ring is marked by an intensity peak.

Figure 2:
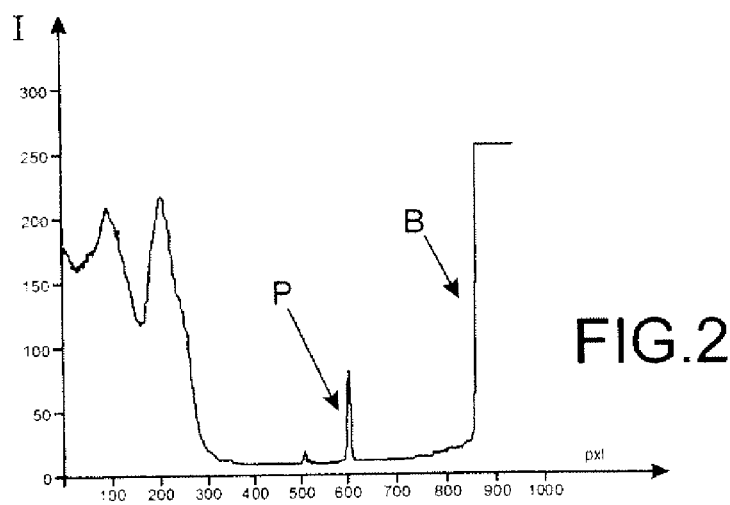
FIG. 2 shows the radial profile of a backlit shadowgraphic image that is obtained during the implementation of a method according to the invention.

Such a profile is shown in FIG. 2. The numbers of the pixels (pxl) are entered on the X axis and the amplitudes (grey levels) on the Y axis (I). The main luminous ring is marked by the peak P and the arrow B designates the external edge of the object. The centre of the object corresponds to the Y axis.

The luminous ring is due to a concentration of rays that have followed the same type of optical path in terms of reflections and transmissions. In the present case, the optical path that is the cause of this luminous ring corresponds to the path followed by the light ray 14 in FIG. 1.

The concentration of light rays is also referred to as "caustic" and constitutes the three-dimensional envelope of these light rays. The main luminous ring is the intersection of this caustic with the sensor of the observation system that is in practice disposed in place of the screen 6 in FIG. 1.

It should be noted that the sensor of the observation system can make small movements along the observation axis, around its initial position. A small movement of this type is denoted $u$. The observation axis is the optical axis 16 of the lens 4 in FIG. 1.

In an ideal case, the internal surface 18 (FIG. 1) of the object observed is a perfect sphere and the luminous ring observed is then a circle.

The application $\rho \rightarrow R_u^*(\rho)$ is considered, which, with a light ray issuing from the source 2 and situated at a distance $\rho$ from the optical axis 16, associates this distance to the intersection of this ray with the sensor of the observation system, after this ray has passed through the entire optical system formed by the object 8 and the lens 4. The following can then be written:

$$R_u^*(\rho) = h_1(\rho) + u h_2(\rho)$$

where $h_1(\rho)$ and $h_2(\rho)$ are smooth applications, that is to say indefinitely differentiatable on R, which depend solely on the optical system. They are given by:

$$h_1(\rho) = \frac{\rho}{\cos 2\psi}$$

$$h_2(\rho) = \frac{1}{f} h_1(\rho) + \tan 2\psi$$

with $$\psi = \arcsin\left(\frac{\rho}{r_1}\right) - \arcsin\left(\frac{n_{ext}\rho}{n_{S_1} r_1}\right) + \arcsin\left(\frac{n_{ext}\rho}{n_{S_1} r_2}\right) - \arcsin\left(\frac{n_{ext}\rho}{n_{S_2} r_2}\right) + \arcsin\left(\frac{n_{ext}\rho}{n_{S_2} r_3}\right)$$

where $n_{ext}$, $n_{S_1}$, $n_{S_2}$ are respective optical indices of the environment external to the object, of the first sphere (layer 12 in FIG. 1) and of the second sphere (layer 10 in FIG. 1); $r_1$, $r_2$, $r_3$ are the respective radii of the three interfaces that are defined by the two-layer object, $r_1$ being the external radius of the external layer 12, $r_2$ the internal radius of this layer 12 (and therefore the external radius of the layer 10) and $r_3$ the internal radius of the layer 10; and f represents the focal distance of the lens 4.

The intersection of the caustic with the plane of the sensor has the equation:

$$\frac{\partial R_u^*(\rho)}{\partial \rho} = 0.$$

For a fixed position of the sensor, the parameter $\rho^*$ is a solution of the previous equation. Thus the radius $R_c$ of the ideal main luminous ring (that is to say without deformation of the internal surface 18) is such that: $R_c = h_1(\rho^*)$.

The acquisition of the measurements is considered below.

Interferometric measurements made on the two-layer object, at the optical axis of the object and close to the poles of this object, by means of an interferential device, directly supply the measurement of the thickness of each layer.

The shadowgraphic images contain, as has been seen, a luminous ring that is extracted by a conventional subpixel contour detection method. The shadowgraphic measurements are obtained by calculating the distance between the centre of the external surface of the two-layer object and the contour detection points.

The backlit shadowgraphy analysis is now considered.

The internal wall of the two-layer object can have surface deformations. These are modelled by a disturbance $\epsilon_1$ on the radius of this sphere that describes the internal wall of the object, a disturbance $\epsilon_2$ on the normal to the sphere, in the plane (P) that is determined by the point of reflection of the light ray on the internal wall of the object and by the optical axis 16 of the objective lens 4 of FIG. 1, the centre O of the object being on this axis, and a disturbance $\epsilon_3$ on the normal, in the plane (Q) that is perpendicular to the plane (P).

An expression of order i with respect to the disturbances $\epsilon_1$, $\epsilon_2$, $\epsilon_3$ and their first derivatives is designated $\eta^i$.

Let $\rho \in R$ and $\theta \in [0, 2\pi]$ be the polar coordinates of the light ray emerging from the collimated light source in a plane perpendicular to the optical axis.

Let $R \in R$ and $\alpha \in [0, 2\pi]$ be the polar coordinates of the light ray that intersects the sensor of the observation system in the particular plane of this sensor.

Let $R^*(\rho)$ be the radius of the luminous ring in the ideal case, that is to say without any disturbance of the internal surface of the two-layer object.

It is assumed that the disturbances $\epsilon_1$, $\epsilon_2$, $\epsilon_3$ are small $C^1$ values, which means that they are of class $C^1$ on $R^2$ and that these disturbances as well as their first derivatives are small.

Because of the axial symmetry of the optical system and the continuity of the disturbances, the polar coordinates (R, $\alpha$) of the light ray intersecting the plane of the sensor of the observation system can be written as follows:

$$\begin{cases} R(\rho, \vartheta) = R^*(\rho) + a_1(\rho)\varepsilon_1(\rho, \vartheta) + a_2(\rho)\varepsilon_2(\rho, \vartheta) + \eta^2 \\ \alpha(\rho, \vartheta) = \vartheta + a_3(\rho)\varepsilon_3(\rho, \vartheta) + \eta^2 \end{cases}$$

where $a_1$, $a_2$, $a_3$ are real functions that depend solely on the properties of the optical system and are smooth, that is to say indefinitely differentiable on R.

The equation of the caustic is always calculated from the following equation:

$$\frac{\partial R(\rho)}{\partial \rho} = 0.$$

It is therefore possible to write:

$\theta(\rho, \alpha) = \alpha - a_3(\rho)\epsilon_3(\rho, \alpha) + \eta^2.$

Thus the equation of any light ray emerging from the optical system and intersecting the observation plane (the plane of the sensor) is defined as follows:

the equation of R in the system of coordinates ($\rho, \alpha$) is:

$R(\rho^*, \theta) = R^*(\rho^*) + a_1(\rho^*)\epsilon_1(\rho^*, \theta) + a_2(\rho^*)\epsilon_2(\rho^*, \theta) + \eta^2.$ and the equation of the caustic is always given by:

$$\frac{\partial R(\rho)}{\partial \rho} = 0$$

in this system of coordinates.

It should be noted that the disturbance $\epsilon_3$ has no influence on the radius luminous ring at first-order level. As a result the equation of the deformed luminous ring (disturbed caustic) in the system of coordinates ($\rho, \alpha$) is written to the first order:

$R_c(\alpha) = R^*(\rho^*) + a_1(\rho^*)\epsilon_1(\rho^*, \theta) + a_2(\rho^*)\epsilon_2(\rho^*, \theta) + \eta^2$ The above equation is very important since it is from this that the use of the measurements on the backlit shadowgraphy image is carried out. This equation makes it possible to collect all the information concerning the deformations $\epsilon_1(\rho^*, \alpha)$ and $\epsilon_2(\rho^*, \alpha)$ of the ideal sphere.

There also exists a relationship between the disturbances $\epsilon_1(\rho, \theta)$ and $\epsilon_3(\rho, \theta)$ that is as follows:

$$\varepsilon_3(\rho^*, \vartheta) = \frac{1}{r\cos^2\varphi^*} \frac{\partial \varepsilon_1(\rho^*, \vartheta)}{\partial \vartheta} + \eta^2$$

where $\phi^*$ is the angle between the point of reflection of the internal surface 18 of the layer 10 and the optical axis, in the plane (P).

It is therefore possible to reconstruct $\theta(\rho^*, \alpha)$ to the first order, according to the angle $\alpha$, which is the angle observed. However, for the following application, this correction is not taken into account since it has no significant influence on the final result.

The spatial estimation of the internal surface of the two-layer object is now considered.

The data supplied by the backlit shadowgraphic method and the interferometry method give information on the surface state of the internal wall of the two-layer object. It is therefore necessary to reconcile the measurements in order to estimate the deformation affecting the internal surface of this object.

For the remainder of the method according to the invention, it is necessary to consider the angle $\theta$ as before and to associate with it another angle $\phi$ in order to form a system of coordinates of the Euler coordinates type, whose origin is the centre O of the object.

The deformations of a sphere are generally modelled by spherical harmonics $e_i(\theta, \phi)$, with $i \in N$. In this regard reference can be made to the following document:

[3] H Groemer, Geometric Applications of Fourier Series and Spherical Harmonics, Cambridge University Press, 1996.

It is therefore natural to consider the topography (or deformation) $\epsilon(\theta, \phi)$ of the internal surface as being a linear combination of spherical harmonics:

$\epsilon(\theta, \phi) = \Sigma_{i=1}^n \lambda_i e_i(\theta, \phi)$ where n is a natural (finite) integer.

Thus linear relationships are obtained between the measurements and the disturbance of the internal surface state, these linear relationships having the amplitudes $\lambda_i$ as unknowns, with $i = 1, \ldots, n$.

It should be noted that, in the above, the disturbances $\epsilon_1$, $\epsilon_2$, $\epsilon_3$ are independent. However, in the example of the invention considered, the deformation $\epsilon(\theta, \phi)$ corresponds to the disturbance $\epsilon_1(\theta, \phi)$, and the other two disturbances $\epsilon_2$ and $\epsilon_3$ are linked to the first one $\epsilon_1$. This amounts to stating that $\epsilon(\theta, \phi)$ entirely determines the disturbances $\epsilon_1$, $\epsilon_2$, $\epsilon_3$.

As explained previously, backlit shadowgraphy puts in relationship the direct measurements on the image and the deformation that is present on the internal wall of the object. In addition, it is considered that the ray issuing from the collimated light source, which is responsible for the formation of the luminous ring, does not emerge from the initial osculatory plane. The deformation considered is then:

$\epsilon(\theta, \phi^*) = \Sigma_{i=1}^n \lambda_i e_i(\theta, \phi^*).$

This equality gives rise to a system of linear equations, the variables of which are the $\lambda_i$ values, with $i = 1, \ldots, n$. The number of equations in this system is the number of angles $\alpha$ that are taken into consideration, and the values of the radius of the luminous ring come from the detection of contours that was mentioned above.

Using the method of least squares, the deformation on the normal and the variation in thickness on the internal wall of the two-layer object are evaluated.

The interferometry directly connects the variation in thickness in the zone observed to the linear combination of spherical harmonics, since the interferometry measurement is a simple reading of the deformation of the internal wall.

Thus, by recombining the measurements obtained by the interferometry and backlit shadowgraphy methods, by means of an algorithm based on the method of least squares, a global estimation of the surface state of the internal wall of the two-layer object is obtained.

Figure 3:
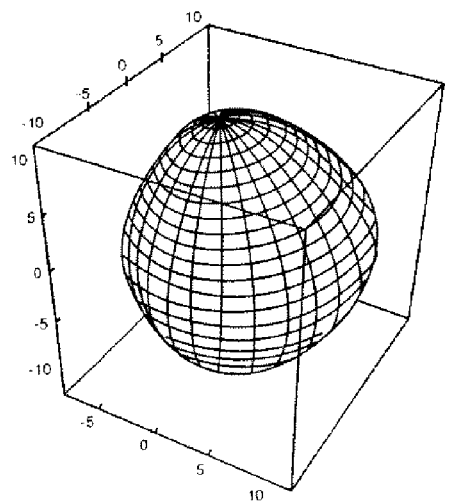
FIG. 3 is the image of the internal surface of a hollow object that is reconstructed by a method according to the invention.
Figure 4:
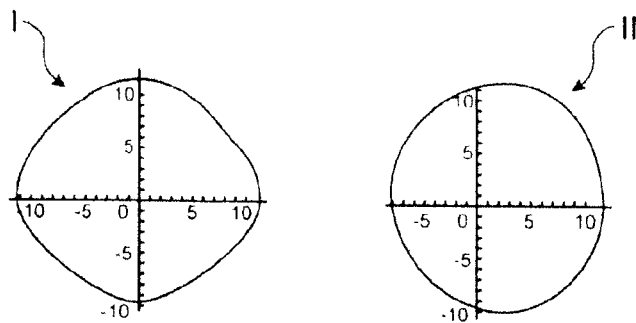
FIG. 4 shows transverse sections of this surface.

FIGS. 3 and 4 illustrate an example of spatial reconstruction of the internal wall of a two-layer object performed in accordance with the invention. FIG. 3 is an image of the reconstructed surface and FIG. 4 shows transverse sections I and II of this surface. The figures show the deformations accentuated since they are not visible to the naked eye. It has been checked that the estimation obtained is superimposed on the real surface.

It has therefore been seen, in the present invention, that the analysis carried out on the backlit shadowgraphy method makes it possible to link the deformation of the luminous ring (deformation in two dimensions) to the deformation present on the internal surface of the translucent or transparent, hollow object, with two layers (three-dimensional information). It should also be noted that the known methods do not translate bidimensional information into three-dimensional information by means of a single view.

The association of a method of measuring by backlit shadowgraphy with an interferometry method makes it possible to evaluate the roughness of the internal surface of a translucent or transparent two-layer hollow object. By means of these two methods, which are implemented at different points, dimensional information is merged.

In the invention, it is possible to replace the interferometry measurement by a second shadowgraphy measurement, made along a viewing axis that is not parallel to the one along which the first shadowgraphy measurement was made. In addition, if the observation made along the second viewing axis is not complete but is made through slits, the interpretation of the shadowgraphy measurements will remain identical.

It is also possible to replace the interferometry measurement by a second backlit shadowgraphy measurement, made along the viewing axis used for the first backlit shadowgraphy measurement, provided that this second measurement is made after the object has been made to turn on itself.

Thus the rotation of the object on itself and the use of a single shadowgraphy viewing axis also allow the use of the method previously described, namely the analysis of the image of the caustic making it possible to go back to the three-dimensional information, and then the reconciliation of the data in order to reconstitute a complete three-dimensional estimation of the internal surface state.

A shadowgraphic device and an interferometric device for implementing the method that is the object of the invention are described below.

Figure 5:
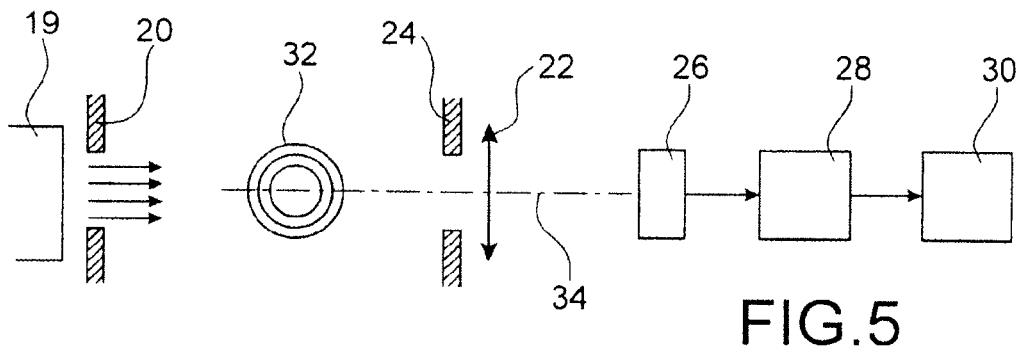
FIG. 5 is a schematic view of another backlit shadowgraphic device that can be used in the present invention.

The shadowgraphy device is shown schematically in FIG. 5 and comprises a visible light source 19, adjustable means 20 for collimating this source and image acquisition means, comprising a lens 22 provided with means 24 of varying the numerical aperture of this lens (or which has the appropriate numerical aperture).

The latter is followed by a CCD sensor 26 (charge transfer device) provided with image processing means 28, with which a display device 30 is associated.

A double-layer hollow sphere 32 that it is wished to study is placed between the source 19 and the lens 22 so that the centre of the sphere is substantially placed on the optical axis 34 of the lens 22. This axis 34 constitutes the viewing axis along which the image of the object is acquired. The lens 22 makes it possible to form the image of a cutting plane of the hollow sphere 32 on the CCD sensor 26.

Figure 6:
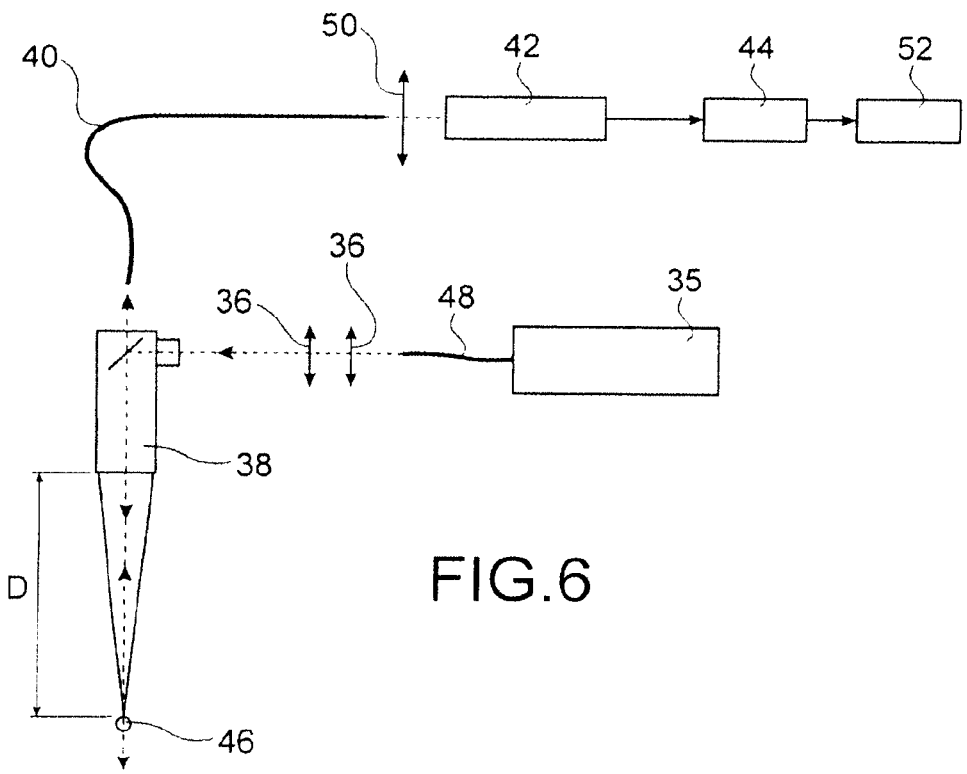
FIG. 6 is a schematic view of an interferometry device that can be used in the invention.

FIG. 6 is a schematic view of the interferometry device. It is more precisely an interferential spectroscopy device for measuring thicknesses without contact.

This device comprises a source of white light 35, a set of shaping lenses 36, a telescope 38, a signal transmission optical fibre 40, a spectrometer 42 and a computer 44.

The light source 35 is used for illuminating the object to be characterised 46. The illumination beam supplied by this source is transmitted by an optical fibre 48 and shaped by the set of lenses 36 so as to adapt the profile of this beam to the geometry of the object to be studied.

The telescope 38, for example of the type sold by the company Questar and the reference QM100, is used for illuminating the object to be analysed and collecting the reflected light. The QM100 telescope allows a working distance D ranging from 15 cm to 38 cm.

At the exit from the telescope, the light signal reflected is injected into the optical fibre 40 and routed as far as the spectrometer 42 in order to make the acquisition of a channeled spectrum. An injector 50 is provided for injecting the light issuing from the fibre 40 into the spectrometer.

The channeled spectrum is transmitted as far as the computer 44 in order to be analysed. This computer is provided with means 52 of displaying the results obtained.

Let us return to essential aspects of the present invention. The latter relates essentially to a method which is used for determining the deformation of the internal surface of a two-layer object and the essential elements of which are:

an analysis of the physical phenomenon referred to as "caustic", containing the information on the deformation of the internal surface, this caustic being defined by the inner edge of the luminous ring that the image of the object has, obtained by backlit shadowgraphy, determination of the information observed by the backlit shadowgraphy chain, the bidimensional disturbance of the luminous ring giving three-dimensional information on the deformation of the internal surface of the object, and elaboration of the principle of merging the incomplete physical measurements (use of the method of least squares and appropriate modelling of the deformations of the internal wall of the object).

Other applications of the invention are described below.

A method according to the invention, of the type previously described for the characterisation of the deformation of hollow spheres with two layers, can be implemented for characterising the deformation of hollow cylinders with two layers.

Figure 7:
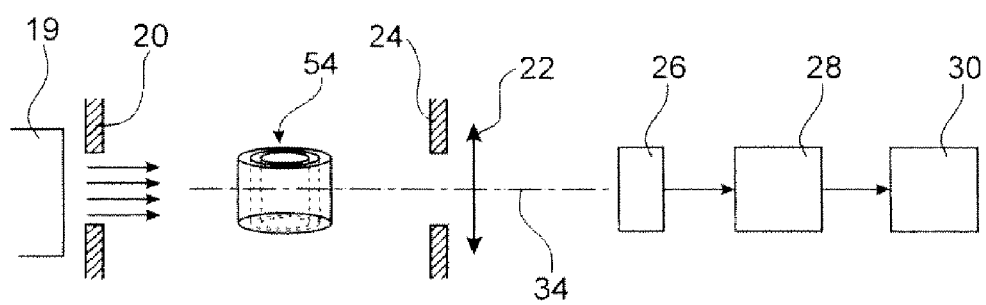
FIGS. 7 and 8 illustrate schematically the backlit shadowgraphic devices that are used for characterising respectively a hollow cylinder and a hollow ellipsoid in accordance with the invention.

The same light source and the same image acquisition chain can be used, as shown schematically by FIG. 7, where the cylinder has the reference 54. Two white bands, relating to the internal surface of the two-layer cylinder, then appear on the shadowgraphic image. It is then necessary to reconsider a modelling of the disturbances.

The same method can also be used for characterising the deformation of hollow two-layer ellipsoids.

Figure 8:
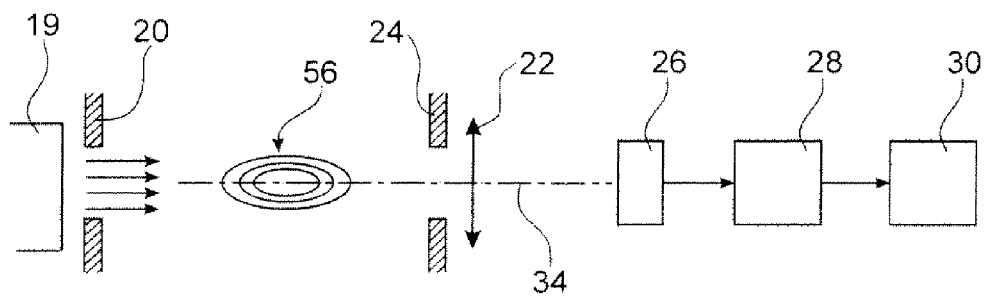

The same light source and the same image acquisition chain can also be used as shown schematically in FIG. 8, where the ellipsoid has the reference 56. There then appears, on the shadowgraphic image, a white band that is related to the internal surface of the two-layer ellipsoid. It is then also necessary to reconsider a modelling of the disturbances.

The same method can also be used for characterising the deformation of hollow two-layer spheroids.

The same light source and the same image acquisition chain can also be used. There then appears, on the shadowgraphic image, a white band that is related to the internal surface of the two-layer spheroid. It is then also necessary to reconsider a modelling of the disturbances.

The present invention also applies to the characterisation of the refractive indices of two-layer objects: using the equation given above that defines the radius of the luminous ring, it is possible to determine the optical refractive index of each of the two layers, the dimensions of which will be determined in advance by means of another measuring system.

It is also possible to determine the optical index of each of the layers using another luminous ring of the image obtained by backlit shadowgraphy.

Thus, from a single shadowgraphic picture, the optical indices of an ideal two-layer object, that is to say without small deformations, are characterised.

The invention claimed is:

1. A method for the contactless measurement of a hollow three-dimensional object, thus having an internal wall, this object comprising an external layer and an internal layer, this object being translucent or transparent vis-á-vis visible light, this method being characterised in that:
   an image of the object is acquired by single-view backlit shadowgraphy, along a first viewing axis, by observing this object with visible light, this image comprising at least one luminous line,
   an equation is established that connects at least one optogeometric parameter of the object to at least one geometric parameter of the luminous line,
   this geometric parameter is determined, and
   the optogeometric parameter is determined by means of the equation and geometric parameter thus determined, in which
   a three-dimensional reconstruction is made of the internal wall of the object over an area that is close to the equator of this object, from the image of the object and the equation, this reconstruction supplying a first set of data,
   the thickness of the internal layer of the object is determined,
   a second set of data relating to the deformation of this internal layer is determined from the thickness thus determined, and
   a reconstruction of the entire internal wall of the object is carried out by means of the first and second sets of data.

2. A method according to claim 1, in which a linear relationship is established between a deformation of the luminous line and disturbances that are present on the internal wall of the object, in order to determine the second set of data.

3. A method according to claim 1, in which the thickness of the internal layer of the object is determined by an interferometric technique.

4. A method according to claim 1, in which the thickness of the internal layer of the object is determined by a shadowgraphic measurement made along a second viewing axis that is not parallel to the first viewing axis.

5. A method according to claim 1, in which the thickness of the internal layer of the object is determined by a shadowgraphic measurement made along the first viewing axis after having effected a rotation of the object.

6. A method according to claim 1, in which the reconstruction of the entire internal wall of the object is carried out by combining the first and second sets of data by means of the method of least squares.

7. A method for the contactless measurement of a hollow three-dimensional object, thus having an internal wall, this object comprising an external layer and an internal layer, this object being translucent or transparent vis-á-vis visible light, this method being characterised in that:
   an image of the object is acquired by single-view backlit shadowgraphy, along a first viewing axis, by observing this object with visible light, this image comprising at least one luminous line,
   an equation is established that connects at least one optogeometric parameter of the object to at least one geometric parameter of the luminous line,
   this geometric parameter is determined, and
   the optogeometric parameter is determined by means of the equation and geometric parameter thus determined,
   in which two optogeometric parameters are determined, consisting respectively of the refractive index of the internal layer and the refractive index of the external layer, from two geometric parameters, consisting respectively of the thickness of the internal layer and the thickness of the external layer.

* * * * *